US006947052B2

United States Patent
Jeremiassen (10) Patent No.: US 6,947,052 B2
(45) Date of Patent: Sep. 20, 2005

(54) VISUAL PROGRAM MEMORY HIERARCHY OPTIMIZATION

(75) Inventor: Tor E. Jeremiassen, Sugarland, TX (US)

(73) Assignee: Texas Instruments Incorporated, Dallas, TX (US)

( * ) Notice: Subject to any disclaimer, the term of this patent is extended or adjusted under 35 U.S.C. 154(b) by 241 days.

(21) Appl. No.: 10/191,175

(22) Filed: Jul. 9, 2002

(65) Prior Publication Data

US 2003/0033480 A1 Feb. 13, 2003

Related U.S. Application Data

(60) Provisional application No. 60/305,391, filed on Jul. 13, 2001.

(51) Int. Cl.$^7$ ................................................ G09G 5/36
(52) U.S. Cl. ........................... 345/557; 345/541; 711/3; 711/113; 711/118
(58) Field of Search ................................. 345/541, 557, 345/558; 711/3, 113, 118–119, 122–123, 129–132

(56) References Cited

U.S. PATENT DOCUMENTS

| | | | |
|---|---|---|---|
| 4,823,286 A | * 4/1989 | Lumelsky et al. | 345/611 |
| 5,442,571 A | * 8/1995 | Sites | 703/26 |
| 5,768,500 A | * 6/1998 | Agrawal et al. | 714/47 |
| 6,145,054 A | * 11/2000 | Mehrotra et al. | 711/119 |
| 6,211,889 B1 | 4/2001 | Stoutamire | |
| 6,775,756 B1 | * 8/2004 | Thusoo et al. | 711/169 |

\* cited by examiner

Primary Examiner—Kee M. Tung
Assistant Examiner—Mackly Monestime
(74) Attorney, Agent, or Firm—Robert D. Marshall, Jr.; W. James Brady, III; Frederick J. Telecky, Jr.

(57) ABSTRACT

In general, and in a form of the present invention, a method is provided for reducing execution time of a program executed on a digital system by improving hit rate in a cache of the digital system. This is done by determining cache performance during execution of the program over a period of time as a function of address locality, and then identifying occurrences of cache conflict between two program modules. One of the conflicting program modules is then relocated so that cache conflict is eliminated or at least reduced. In one embodiment of the invention, a 2D plot of cache operation is provided as a function of address versus time for the period of time. A set of cache misses having temporal locality and spatial locality is identified as a horizontally arranged grouping of pixels at a certain address locality having a selected color indicative of a cache miss. Cache conflict is determined by overlying an interference grid or a shadow grid on the plot responsive to the address locality such that a plurality of lines are displayed at other address localities that map to the same region in cache as the first address locality. In order to relocate a program module, a relocation parameter is provided to a linker to cause the program module to be linked at a different address.

19 Claims, 10 Drawing Sheets

VISUAL PROGRAM MEMORY HIERARCHY OPTIMIZATION

This application claims priority under 35 USC §119(e)(1) of Provisional Application No. 60/305,391, filed Jul. 13, 2001.

FIELD OF THE INVENTION

This application relates to computers and computer systems and further relates to a method and apparatus for analyzing and improving program execution in a hierarchical memory.

BACKGROUND OF THE INVENTION

Microprocessors are general-purpose processors that provide high instruction throughputs in order to execute software running thereon, and can have a wide range of processing requirements depending on the particular software applications involved. Many different types of processors are known, of which microprocessors are but one example. For example, Digital Signal Processors (DSPs) are widely used, in particular for specific applications, such as mobile processing applications. DSPs are typically configured to optimize the performance of the applications concerned and to achieve this they employ more specialized execution units and instruction sets. Particularly in applications such as mobile telecommunications, but not exclusively, it is desirable to provide ever-increasing DSP performance while keeping power consumption as low as possible.

As computer systems become more complex, it is becoming more difficult for human beings to easily understand and grasp all the intricacies involved in any given computer system. During execution, a computer system may move units of memory, such as pages or cache lines, between units of hardware. As more complex caching systems are designed and as caching systems begin to have more and more levels, it is becoming more and more difficult for human beings to understand whether a given caching system is operating efficiently for the software executing on the computer system.

Software currently exists to aid a human being in visualizing certain aspects of a computer's memory, such as the performance impact of caching. These conventional software programs, however, display memory using a line-by-line display on a display device. Another example of conventional visualization software displays memory accesses by address on one axis of a graph and time on the other axis. This method also fails to present data in a way that effectively aids human understanding of the relationships between the data.

The term "locality of memory" refers to the location of data (e.g., variables) within memory in time and space. Accessing a variable closely in time is called "temporal locality." Accessing variables stored physically close together is called "spatial locality." Physical locations in a memory that are close together have a high spatial locality. For example, a $49^{th}$ memory unit and a $50^{th}$ memory unit (such as bits, bytes, words, pages, etc.) that are physically close to each other in a computer memory have a high spatial locality. As another example, if a variable is read twice in quick succession, the variable has a high temporal locality. On modern computer systems, temporal and spatial locality impact performance. Instruction fetches for a program module that contains several tens or hundreds of bytes of instruction code that is executed in a looping manner exhibits both temporal and spatial locality.

SUMMARY OF THE INVENTION

In general, and in a form of the present invention, a method is provided for reducing execution time of a program executed on a digital system by improving hit rate in a cache of the digital system. This is done by determining cache performance during execution of the program over a period of time as a function of address locality, and then identifying occurrences of cache conflict between program modules. One of the conflicting program modules is then relocated so that cache conflict is eliminated or at least reduced.

In one embodiment of the invention, a 2D plot of cache operation is provided as a function of address versus time for the period of time. A set of cache misses having temporal locality and spatial locality is identified as a horizontally arranged grouping of pixels at a certain address locality having a selected color indicative of a cache miss. Cache conflict is determined by overlying an interference grid or a shadow grid on the plot responsive to the address locality such that a plurality of lines are displayed at other address localities that map to the same region in cache as the first address locality. In order to relocate a program module, a relocation parameter is provided to a linker to cause one of the conflicting program module to be linked at a different address.

BRIEF DESCRIPTION OF THE DRAWINGS

Particular embodiments in accordance with the invention will now be described, by way of example only, and with reference to the accompanying drawings in which like reference signs are used to denote like parts, and in which.

DETAILED DESCRIPTION OF EMBODIMENTS OF THE INVENTION

Figure 1:
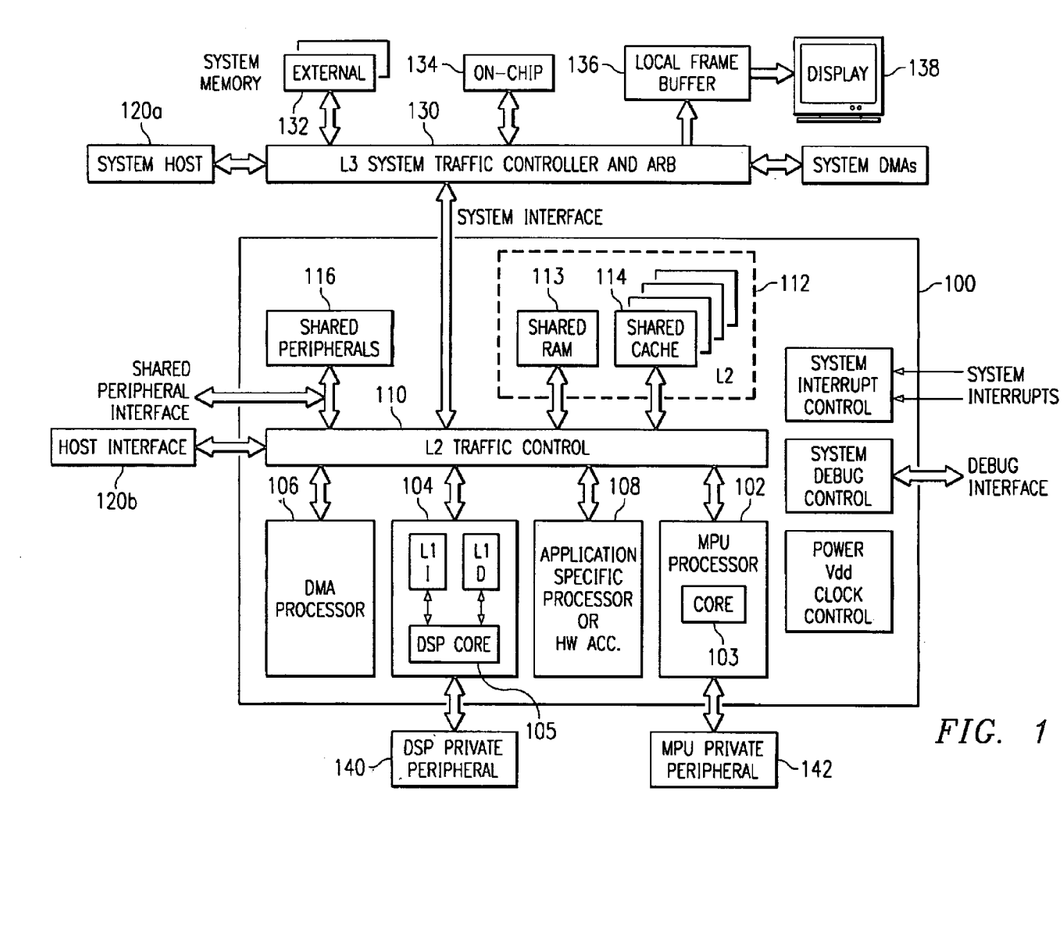
FIG. 1 is a block diagram of a digital system having a memory hierarchy with multiple levels of memory.

FIG. 1 is a block diagram of a digital system of a digital system having a memory hierarchy with multiple levels of memory. In the interest of clarity, FIG. 1 only shows those portions of megacell 100 that are relevant to an understanding of an embodiment of the present invention. Megacell 100 includes a control processor (MPU) 102 with a 32-bit core 103 and a digital signal processor (DSP) 104 with a DSP core 105 that has a level one (L1) instruction cache L1-I and a level one data ache L1-D. In this embodiment, DSP core 105 includes two sets A,B (not shown) of functional units. Each set includes four functional units: multiplier M, logical/arithmetic unit L, shift/arithmetic unit S. and data load/store unit D. MPU 102 and DSP 104 share a block of memory 113 and a cache 114, that are referred to as a level two (L2) memory subsystem 112. An L2 traffic control block 110 receives transfer requests from a host processor connected to host interface 120b, requests from control processor 102, and transfer requests from a memory access node in DSP 104. The traffic control block interleaves these requests and presents them to the shared memory and cache. L2 shared peripherals 116 are also accessed via the traffic control block. A direct memory access controller 106 can transfer data between an external source such as off-chip memory 132 or on-chip memory 134 and the shared memory. Various application specific processors or hardware accelerators 108 can also be included within the megacell as required for various applications and interact with the DSP and MPU via the traffic control block. Details of general construction for DSPs are well known, and may be found readily elsewhere. For example, U.S. Pat. No. 5,072,418 issued to Frederick Boutaud, et al, describes a DSP in detail.

External to the megacell, a level three (L3) control block 130 is connected to receive memory requests from internal traffic control block 110 in response to explicit requests from the DSP or MPU, or from misses in shared cache 114. Off-chip external memory 132 and/or on-chip memory 134 is connected to system traffic controller 130; these are referred to as L3 memory subsystems. A frame buffer 136 and a display device 138 are connected to the system traffic controller to receive data for displaying graphical images. A host processor 120a interacts with the external resources a system traffic controller 130. A host interface connected to traffic controller 130 allows access by host 120a to external memories and other devices connected to traffic controller 130. Thus, a host processor can be connected at level three or at level two in various embodiments. A set of private peripherals 140 are connected to the DSP, while another set of private peripherals 142 are connected to the MPU.

Figure 2:
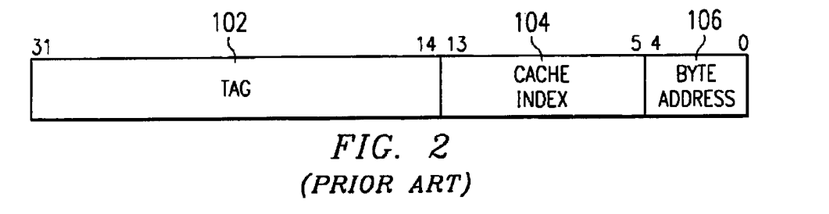
FIG. 2 illustrates a known scheme for allocation of address bits for accessing a cache.

FIG. 2 illustrates a known scheme for allocation of address bits for accessing a cache. A cache is a small fast memory that is used to temporarily hold data or code that is likely to be accessed within a reasonably short amount of time. It differs from local memory in that it is not separately addressable, but operates automatically, without programmer intervention. Caches work by taking advantage of two forms of locality seen both in instruction and data memory reference streams, temporal locality and spatial locality. Temporal locality holds that a memory location that has been referenced recently is likely to be referenced again. Spatial locality holds that a memory location that is close to a recently referenced memory location is likely to be referenced.

A cache is divided into a set of addressable units called cache blocks, which hold the data stored in the cache. The size of the cache block, generally a power of 2, determines how much data is transferred in or out of the cache when a new data is fetched into the cache or when data is written back to main memory from the cache. A large cache block takes better advantage of spatial locality than a small, but may be less economical in terms of hardware and the time it takes to fill the cache block with new data.

Each cache block in the cache has a unique address. Take for instance a 16 KB cache with 32-byte cache block size. It has 512 different cache blocks, with the addresses 0–511. This means that out of a 32-bit address, the lowest 5 bits selects the byte address within a cache block ($2^5$=32), illustrated as address field 106. The next 9 bits, portion 104, is used as the address of the cache block ($2^9$=512). This field of the address is also called the cache index. The remaining 18 bits, field 102, is known as the tag, and is stored with the cache block to uniquely identify the address range of memory it contains.

Upon a load or store instruction, the CPU sends the effective memory address to the cache. The cache controller divides the address into the byte index (lower order bits), the cache index and the tag. It then uses the cache index to select a cache line and compares the tag stored with that cache block against the tag from the CPU. This is known as a tag lookup. If the tags match, the data stored in the cache line is accessed, and using the byte index, the correct portion of the cache line is selected and sent back to the CPU. This is a cache hit. If the tags do not match it is a cache miss. In this case, the cache controller requests a cache line worth of data, containing the data referenced by the address from the CPU, from the next level in the memory hierarchy. The data in the cache line is then replaced by the new data, and the new tag is written into the tag store. The memory access then continues as if there was a hit.

Figure 3:
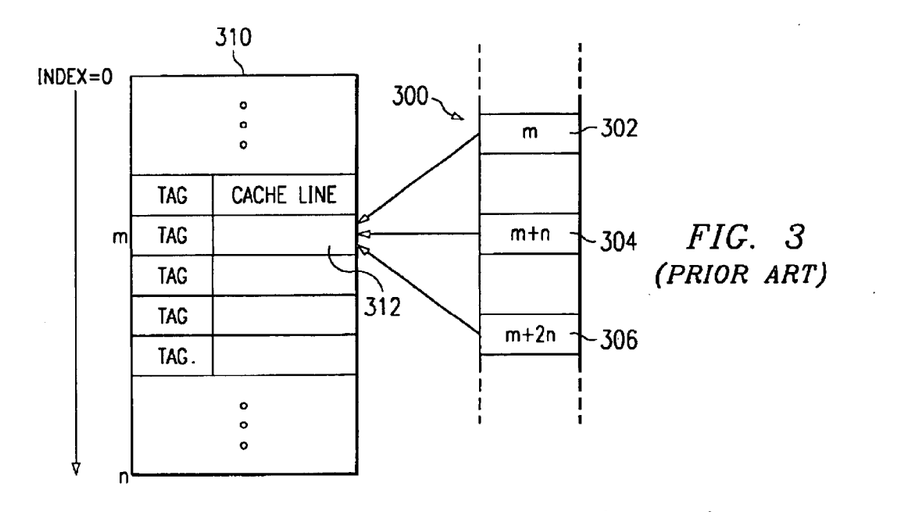
FIG. 3 is a memory map illustrating a resultant mapping of equally spaced memory regions into a same line of an example cache.

FIG. 3 is a memory map illustrating a resultant mapping of equally spaced memory regions into a same line of an example cache. For a memory region 300, a 32 byte block of memory 302 at an address having a cache index value of m will map into cache 310 at a line 312 having an index value of m. 32 byte memory block 304 is located at an address that is n bytes away from block 302, where n is the size of the cache and is 16 KB in this example. Similarly, memory block 306 is located at an address that is 2n away from block 302. All three blocks 302, 304, 306 map into the same cache line 312. This same pattern is repeated throughout memory 300.

The cache described in the previous section is known as a direct mapped cache. That is, each address can only be stored into a single cache block. In many cases such a cache gives very good performance while being very fast at a low cost in hardware. However, if there are two or more frequently accessed pieces of data (or code) that are located in memory so that they map to the same cache block, references to one would cause the other to be evicted from the cache. In the above example, if there were two variables, A and B, located within 32 byte regions 302, 304 or 306 (or a multiple of 16 KB) apart, their cache indices would be identical, and when A is referenced, B would be evicted from the cache (assuming of course it had been referenced first). Subsequently, if B is referenced multiple times within a short amount of time, but every reference to B is followed by a reference to A, all the references will miss in the cache. This is known as a cache conflict or thrashing, and the resulting misses are known as conflict misses.

In order to reduce the likelihood of conflict misses in the cache, it can be designed as a set associative cache. An mKB n-way set associative cache operates in principle as n parallel m/n KB direct mapped caches. When a tag lookup is performed, it is done for each of the n "sub-caches". If any sub-cache has a match, there is a cache hit, and data from that sub-cache is returned. If there is a miss, the cache block that was accessed least recently is evicted, and the new data is stored in its place. Note, the data is never replicated. It is always stored in only one cache block. What this does, is that it allows for the case of having n items that interfere in the cache without incurring any conflict misses. The drawback is that a set-associative cache typically costs more in both hardware and power. Off course, conflict misses can still occur if more than n items are accessed with temporal locality or if the replacement algorithm of the cache is not perfect.

Copy Back vs. Write-Through. When a store instruction writes data to memory, there are two main ways the store can be handled by the cache. In a copy-back cache the data is written into the cache block, but not written to memory, and the cache block is marked "dirty". When a dirty cache block is evicted from the cache, its content is different from that of the main memory, and thus must be written back to main memory. If a cache block is not dirty, the main memory content is identical and obviously, does not need to be updated. In a write-through cache, the data is both written into the cache block as well as main memory. This guarantees that main memory is always coherent with the cache that is, they always contain identical data. The draw back is the larger number of write transactions that the system has to handle.

Write-Allocate vs. No Write-Allocate. The previous discussion has assumed that when a reference (load or store) misses in the cache, the requested data is fetched and written into the cache, thus evicting another cache block. This kind of cache is known as both read-allocate and write-allocate. However, some applications and system designs benefit from a no write-allocate cache. In such a cache, a write that misses does not cause data to be fetched into the cache. Instead, the write bypasses the cache and is performed at the next lower level of the memory hierarchy instead. The cache remains unchanged. In order to prevent the CPU from stalling when such writes miss in the cache, the stores are typically buffered in a write-buffer, that control the writing of the value to memory. This allows the CPU to continue without penalty as long as the write-buffer is not full. Thus, for caches with no write-allocate policies, write-misses often do not cause any performance penalties.

Cache Misses, the Three C's. As mentioned in the discussion on set-associativity, cache misses can be divided into three classes according to their causes. These are: compulsory misses, capacity misses, and (as previously mentioned) conflict misses.

Compulsory misses, also known as first reference misses, are cache misses that occur because the data, or the data collocated in the same cache block, has not previously been referenced. Thus there is no way the data could have been brought into the cache, and the miss is therefore "compulsory".

Capacity misses are cache misses that occur due to the cache being smaller than the set of data (or code) that is referenced (working set). Capacity misses can be, at least partially, eliminated by restructuring the data to be accessed in smaller chunks, or dividing loops up so that each fits in the cache.

Conflict misses are cache misses that occur because more than one piece of data (or code) that is referenced maps to the same cache block, and that miss is not due to the cache being too small. Conflict misses can be eliminated by changing where the data or code is located in memory relative to each other, so that their cache indices are not the same, and thus they do not conflict. Note, the simulator provided in the present embodiment will offers an option to cause the generated trace to encode and differentiate between references causing conflict misses and other references. This is selected by a "Track Conflict Misses" box in the "Simulate" dialog.

Techniques to remedy cache misses.

There are many techniques for eliminating cache misses, and there is a large body of literature on this topic. Therefore, only the roughest guideline will be given here. The first step is to identify where the cache misses occur, and what is the most likely root cause of the cache misses. Recall that compulsory misses are seldom easy to remedy.

If the cache misses are capacity misses the answer is either to try to access less data or code, or alternately, to maximize the reuse of the objects. To illustrate a large data set, consider a matrix multiply example. A first version does not reuse the data while it is still in the data cache, but goes through the entire array dimension before any reuse is attempted. An improved second version uses "blocking" or "tiling" to increase the reuse of the array elements before they are evicted from the data cache, drastically improving the cache performance. To illustrate a large code set, consider a large loop example. If the loop is too large to fit into the instruction cache, if may be possible to split the large loop into two or more smaller loops, one executing after the other. That way, cache misses are only incurred in the first iteration of each of the new smaller loops as opposed to every iteration of the large loop. If it is not possible to split the loop, it might be profitable to trade code size for performance. Given that each instruction cache costs at least 5 cycles on the processor of FIG. 1, compiling for smaller code size might actually improve performance, though it is not guaranteed.

If the cache misses are due to conflicts in the cache the answer is to move the conflicting pieces of data or code relative to each other. For code this is not too complex. By compiling with subsections ('-mo') option, each function is put into its own subsection and thus becomes independently relocatable. A suitable link command file then allocates the functions appropriately. This may result in "holes" in the program memory map. Alternatively, a cache conflict may be eliminated by moving one or more other functions in an ordered linked list so that the conflicting modules are thereby moved relative to each other. For data, it is possible to assign data structures to separate sections, but this does require the manual insertion of pragmas.

Figure 4:
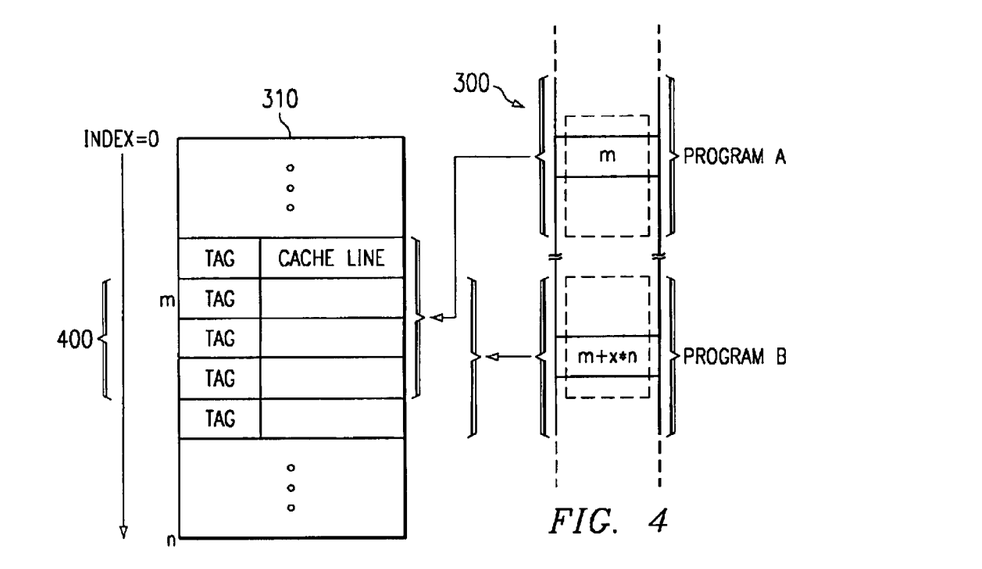
FIG. 4 is a memory map illustrating two program modules that map into a same region of the cache of FIG. 3.

FIG. 4 is a memory map illustrating two program modules, program A and program B, that both map into a same region 400 of the cache of FIG. 3. Such a region will be referred to herein as an interference region. While the cache mapping of the two programs may not entirely overlap, the portion that does overlap in the interference region will result in cache misses if both program modules execute in an interleaved manner in time, referred to as temporal locality.

Figure 5:
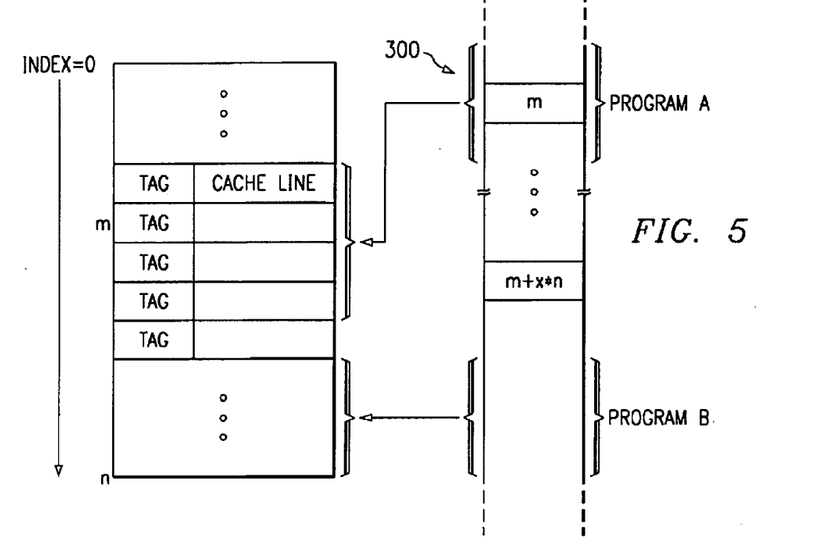
FIG. 5 is a memory map illustrating how one of the program modules of FIG. 4 can be relocated to avoid cache thrashing if the two program modules are executed in temporal locality, according to an aspect of the present invention.

FIG. 5 is a memory map illustrating how one of the program modules of FIG. 4 can be relocated to avoid cache thrashing if the two program modules are executed in temporal locality, according to an aspect of the present invention. In this case, program module B is relocated in memory 300 so that its addresses do not map to the same cache indexes as program module A. Of course, program module A could have been relocated to produce a similar non-overlapping result.

Figure 6:
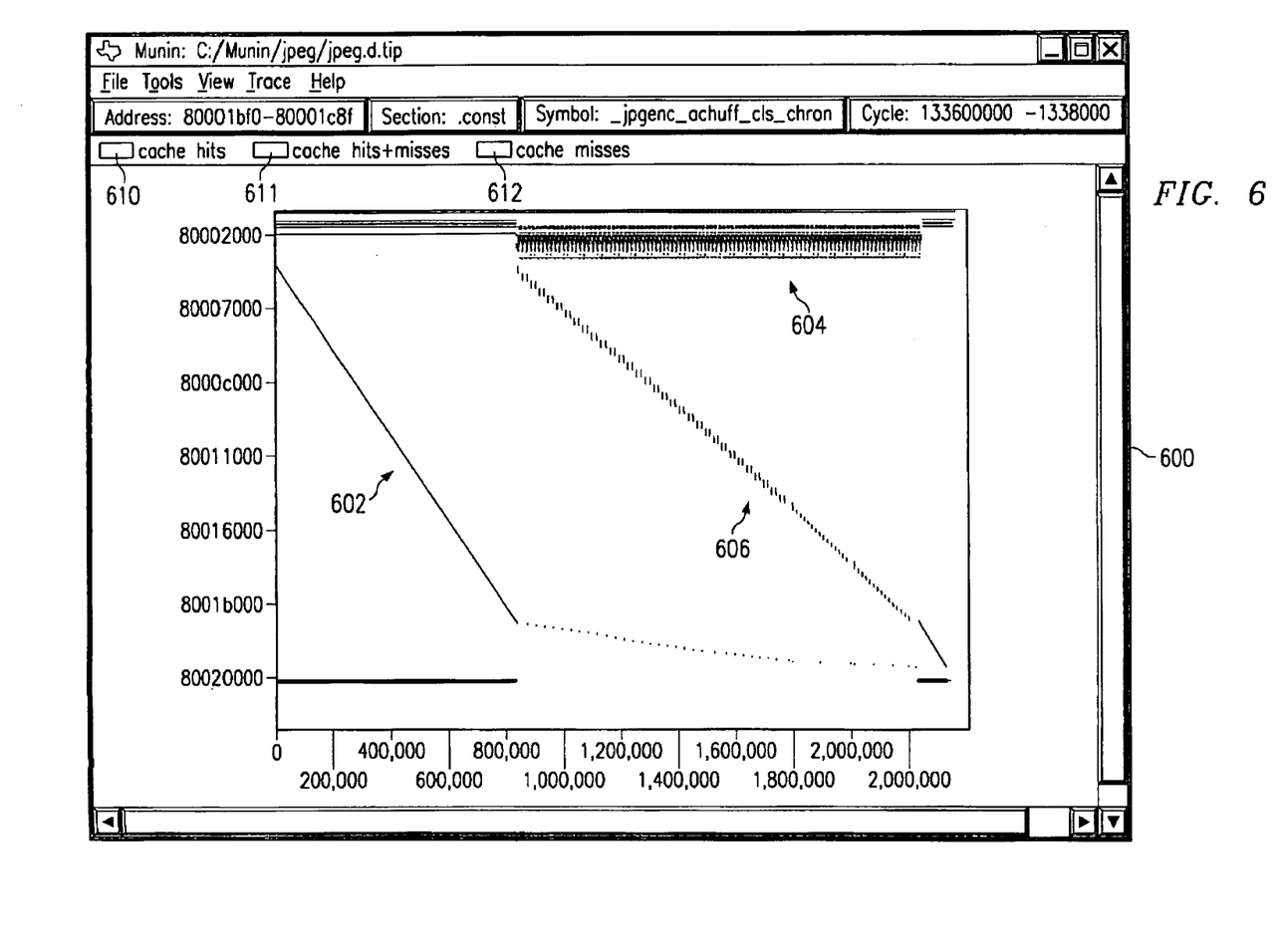
FIG. 6 is a plot of data cache performance of a simulated execution of a program, plotted as address versus time.

FIG. 6 is a plot of data cache performance of a simulated execution of a program, plotted as address versus time. An embodiment of an aspect of the present invention is a program development tool that graphically visualizes the memory reference pattern of a program over time. Using color-coding, the references are categorized according to whether they hit or miss in the cache. Symbolic information, when available in the executable, allows for easy identification of functions and major data structures. This enables a programmer to quickly target the areas of code and data that are incurring cache misses, and provides a road map for applying optimizations and transformations to improve cache performance. For instance, the display can easily highlight conflict misses in the instruction cache that occur because two or more functions map to the same place in the cache. Knowing this, the programmer can modify a link command file to allocate the affected functions so that their footprints in the cache do not overlap, thus eliminating these "useless" cache misses.

Informational display area 600 is located right below the menu bar. It shows information related to the pixel currently under the cursor, and is updated when the cursor moves over the display. The area is divided into four segments: Address, Section, Symbol and Cycle.

Address shows the address range represented by current pixel.

Section shows the name of the coff section of the executable the address range of the current pixel belongs to. If the address range contains (parts of) more than one section, the name of the section that occurs later in the coff section header table is displayed.

Symbol shows which global symbol of the executable the address range of the current pixel belongs to. If the address range contains (parts of) more than one symbol, the name of the symbol that occurs later in the coff symbol table is displayed.

Cycle shows the range of simulation cycles represented by the current pixel. This is always a multiple of the trace sample interval.

A Legend area is located right below the informational display area. It shows the key 610–612 to the current color map. The set of color maps is specific to each trace type. In the figures presented here, colors are represented by shading and symbols, but in a preferred embodiment colors such as red, yellow and green are used. For example, key 610 can indicate that any pixel that represents only cache hits is displayed as green, key 611 can indicate that any pixel that represents cache hits and cache misses is displayed as yellow, and key 612 can indicate that any pixel that represents only cache misses is displayed as red.

The horizontal axis is the time axis. It shows the simulated cycle counts. The scroll bar allows easy scrolling back and forth within the trace, as well as fast repositioning. The length of the slider indicates the fraction of the trace displayed.

The vertical axis shows the addresses of the memory references. The scroll bar allows easy scrolling through the address space. By default, the entire range of referenced memory is displayed when a trace file is first opened.

The graphical display area is the main area in the center of the window. It shows a two-dimensional plot of the memory references encoded in the trace file, color coded to highlight either cache hits and misses or the type of references (loads/stores).

The initial view of memory encompasses the entire range of referenced memory. For some applications using link maps that put objects at widely spaced memory locations, this range can be very large. If the range is too large, e.g., covers multiple megabytes, the plot of memory references will show up as very narrow bands with little detail. If this happens, a "Zoom in" or "Set address range" entries can be selected in the "View" menu to narrow down the address range to something that shows more detail.

The memory reference patterns for the data and instruction caches are captured by a specially instrumented simulator and written to three trace files: <file>.i.tip,<file>.d.tip, and <file>.x.tip, where <file> is the executable name without the .out extension. The process of simulating program execution and capturing a trace that represents the program execution is known in general, and will therefore not be described in detail herein.

Each trace file tracks a different aspect of the cache memory system behavior. The .i.tip file contains trace data that correlates instruction references with their outcomes (hit/miss) in the level 1 instruction cache (L1P). The .x.tip correlates instruction memory references to the cache outcome (hit/miss) in the level 1 data cache (L1D) of loads and stores. Lastly, the .d.tip correlates data references with their outcomes (hit/miss) in the level 1 data cache.

The trace files contain all necessary data to visualize the memory reference pattern of an application, including any related symbolic information available from the executable.

The trace data contained in the trace file is organized as a sequence of frames, one frame for each time interval. Within each interval there are zero or more records. Each record contains an address range of at least 1 word and an attribute. The attribute encodes the event associated with the address range. The events can be: memory load, memory store, cache hit, cache miss, and no memory access. Not all trace files encode all events. The number of occurrences of events is not encoded, though multiple events may be encoded for each address range. For instance, within an interval, a memory load that hit in the cache might have occurred on the same word as a memory load that missed in the cache. In this case, the attribute would encode the memory load as well as both a cache hit and a cache miss.

When the trace is visualized, it is very likely that the screen resolution does not support the full resolution of the trace, unless enlarged by using a zoom in feature. This means that each pixel must correspond to multiple words and/or time intervals in the trace. The result is that multiple trace records might have to be visualized using the same pixel by combining their attributes. For example, if one pixel encodes trace data that represents several cache accesses that all resulted in hits, then that pixel is displayed as green. If another pixel encodes trace data that represents several cache accesses that resulted all in misses, then that pixel is displayed as red. Similarly, if another pixel encodes trace data that represents some cache accesses that resulted in hits and also other cache accesses that resulted in misses, then that pixel is displayed as yellow. This combining is undone whenever the image is enlarged sufficiently.

It is important to note that the length of the time interval is set when invoking the simulator. This means that the level of detail possible along the time axis (x-axis) is fixed for any given trace file. References within a time interval cannot be resolved (in time) with respect to each other. However, it is possible to "zoom out" along the time axis using a "Cycle resolution . . . " entry in a "View" menu of the program development tool.

The instruction memory references are encoded in the .i.tip file. The supported events are memory load, cache hit and cache miss in the level 1 instruction cache—L1P. Note, unlike data references, the instruction cache references are performed on 32 byte blocks in the system of FIG. 1. Therefore, the finest resolution along the address axis (y-axis) is limited to 32 bytes. Moreover, it is important to bear in mind that the instruction cache references are generated early in the execution pipeline of DSP 105. This means that there are a number of cycles between when an instruction is fetched from the cache until it is executed. The number of cycles is dependent on the number of instructions issued per cycle and the frequency of branches, but will not be less than five cycles. This fetching ahead leads to extra fetches passed taken branches. That is, by the time a branch instruction executes and the target instructions are requested from the cache, references for up to five additional 32-byte blocks of instructions have already been issued to the cache. The effect of this on the trace is that the file may contain references to instructions that were never executed, but every executed instruction is contained in the trace. The most visible result of this is the "overshoot" (fetching passed the end) that can be seen at the end of each function.

The data memory references are encoded in the .d.tip file. The supported events are memory load, memory store, cache hit and cache miss (in the level 1 data cache—L1D). The address granularity is 4 bytes, meaning that any access to a half word or a byte is visualized as if it were to a full word. There is no "overshoot" for the data memory references.

The .x.tip file encodes a cross-reference of instruction memory accesses with data cache outcomes. That is, the addresses are the same as for the instruction memory reference trace (.i.tip), but the events are taken from whether there were loads and stores contained within those instructions and whether those loads and stores hit or missed in the data cache (L1D). For instance, an instruction cache reference might have memory load, memory store and cache hit events encoded if it contained at least one executed load instruction, one executed store instruction and all these data memory references hit in the data cache.

The supported events are no memory access, memory load, memory store, cache hit and cache miss in the level 1 data cache—L1D. The no memory access event is used for instruction cache references that did not contain executed loads or stores (either there were no loads or stores in among the instructions, they were not executed, or they were executed but predicated false). The instruction memory cross-reference trace does not have "overshoot". However, the address granularity is 32 bytes.

The simulator used to generate the memory reference traces is cycle accurate with respect to DSP core 105. It does not, however, account for cycles, due to cache misses, nor does it perform any significant simulation of peripherals, though limited support for a functional DMA model can be enabled with an option so that activity due to DMA 106 is modeled. Level 1 caches are simulated in terms of accurately modeling hits and misses under the assumption of an infinite flat level 2 memory. For other types of processors, the instruction pipeline may have different characteristics that are easily comprehended by an appropriate simulator; the description given here is not to be construed as a limitation to one particular type of processor. Other embodiments may also simulate and trace the operation of L2 and L3 memory/cache layers of a memory hierarchy.

The simulator produces a wide range of statistics. These are presented in a separate window following the simulation. The cache statistics are shown at the bottom of this window. For purposes of the following description, an example program was selected for simulation that performs a jpeg transform on a 256×256 pixel image. Table 1 provides an example of the type of simulator statistical information that can be provided at the completion of a simulation.

TABLE 1

Simulator Statistics

Simulation done

| Total cycles: | 2346433 | |
|---|---|---|
| Core cycles (excl. stalls): | 2229931 | (95.03%) |
| Cross-path stall cycles: | 116502 | (4.97%) |
| Nop cycles: | 585195 | (24.94%) |
| Instructions executed (incl. nops): | 7304406 | |
| Instructions executed (excl. nops): | 7122334 | |
| Branches executed: | 429757 | |
| Total ipc: | 3.035 | |

Functional unit utilization:

| | L | M | D | S |
|---|---|---|---|---|
| A: | 34.24% | 11.16% | 57.70% | 46.25% |
| B: | 34.52% | 15.28% | 52.95% | 51.44% |

Issue statistics (not counting hw-stalls):

| 0 instructions: | 585195 | (24.94%) |
|---|---|---|
| 1 instructions: | 295327 | (12.59%) |
| 2 instructions: | 282389 | (12.03%) |
| 3 instructions: | 99602 | (4.24%) |
| 4 instructions: | 46374 | (1.98%) |
| 5 instructions: | 190754 | (8.13%) |

Referring again to FIG. 6, a trace file jpeg.d.tip for the jpeg example has been selected and displayed, which contains data memory references, as describe previously. The vertical axis contains the full range of memory that was referenced in the instruction cache, which for the example program ranged over approximately 80002000(hex) to 80020000. The entire program took over 2 million cycles to simulate, as indicated in Table 1. The horizontal axis displays time units and the default setting displays the first 200,000 cycles worth of simulated data. In order to view the entire trace, from the "View" menu a "Cycle resolution . . . " entry is selected, and set it to 10, so that all 2 million cycles are presented, as illustrated in FIG. 6.

As the cursor is moved across the display, informational display area 600 just below the menu bar updates with the current address range, section, symbol (if any) and cycle range corresponding to the pixel currently under the cursor. Note the display shows three basic patterns. First part 602 of the trace corresponds to the reading of the input files. This entails a large amount of cache misses and will be plotted mostly red, according to key 612. Then the actual encode is performed in trace portion 604, followed by the writing of the output file indicated in trace portion 606. Trace 604 involves cache misses, hits, and combination misses and hits, and will therefore be plotted in the various colors according to the simulation results and keys 610–612. During the output file writing operation, illustrated by trace portion 606, hits and misses occur and this trace is mostly plotted as yellow, according to key 611.

Using the "Trace" menu, two different color schemes can be selected: "hits/misses" and "loads/stores". One scheme color-codes the memory references according to whether they were cache hits or cache misses, the other according to whether the references were loads or stores.

Using the "Trace" menu, some of the references can be toggled on and off. For instance, "stores" and "cache hits" can be toggled off to see only the loads that missed in the cache.

Figure 7:
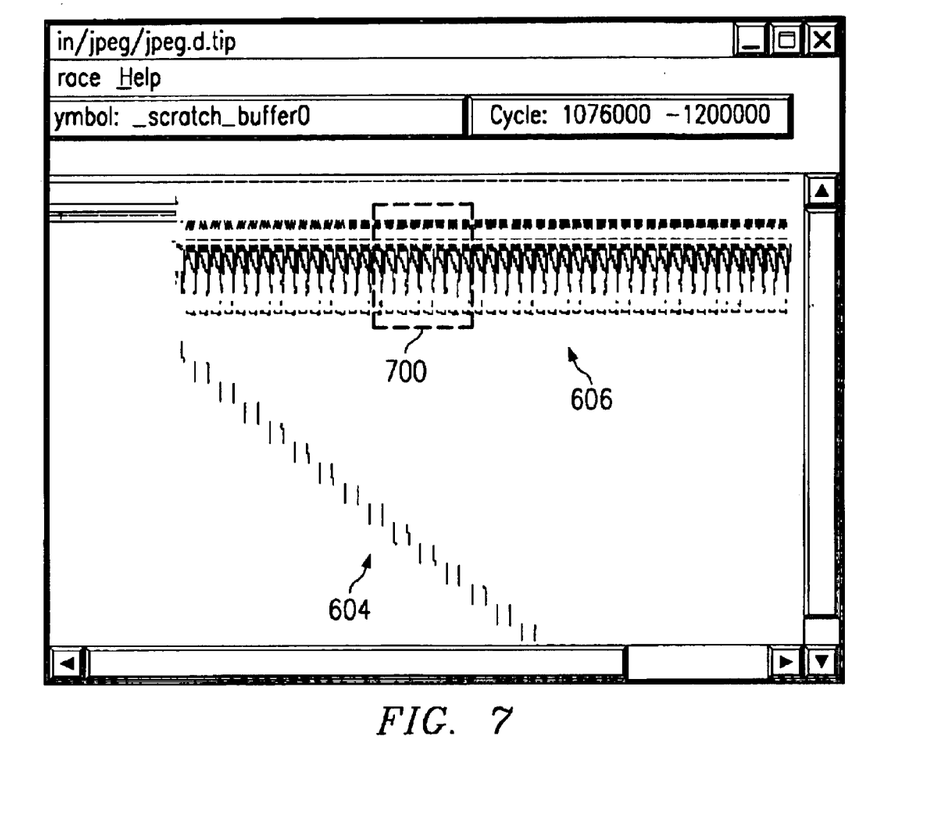
FIG. 7 illustrates selection of a small portion of the plot of FIG. 6.

FIG. 7 illustrates selection of a small portion of the plot of FIG. 6. From the "View" menu, a "Zoom in" entry is selected, and a rectangle 700 is selected by clicking in opposite corners, as is commonly done in various graphical user interfaces (GUI).

Figure 8:
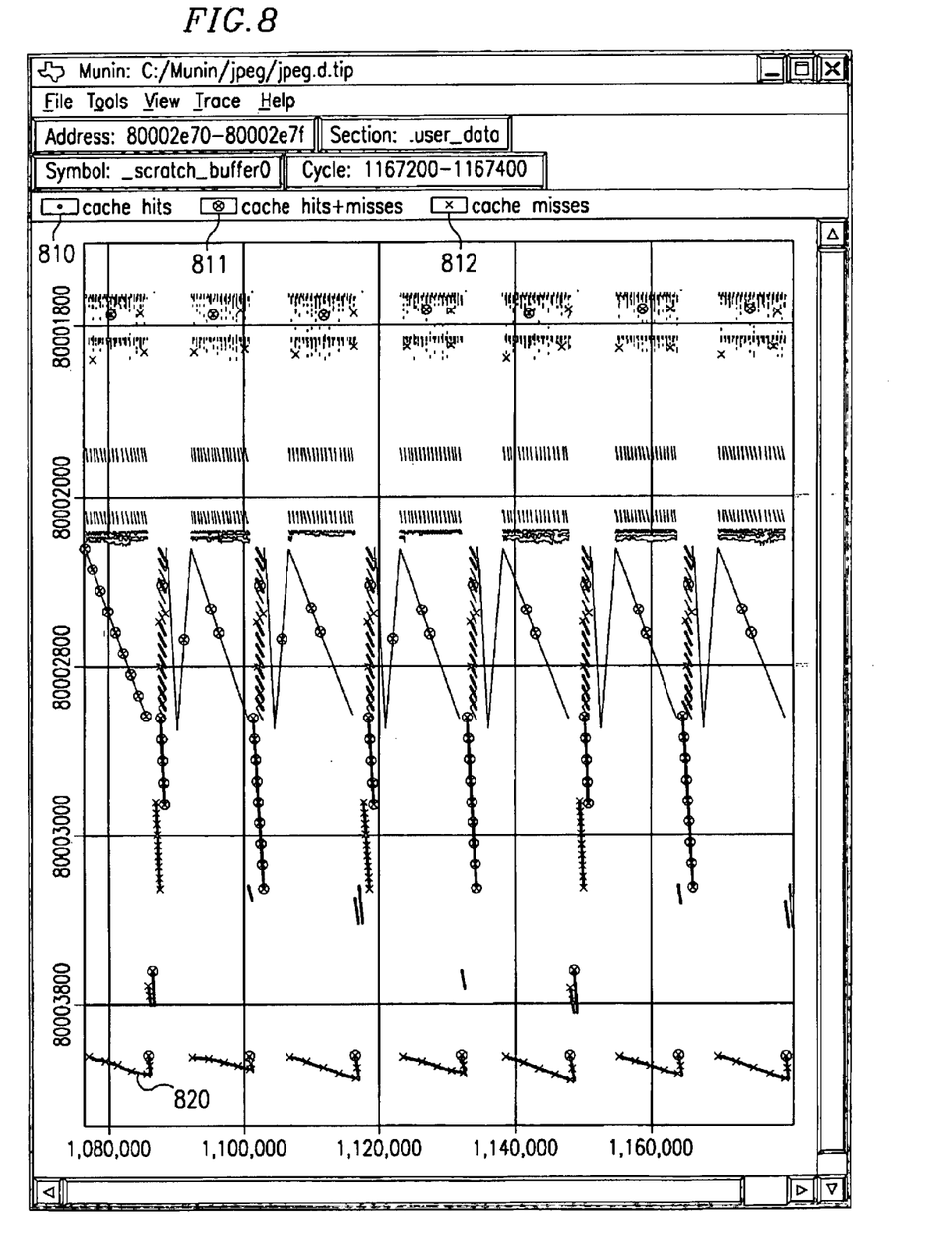
FIG. 8 illustrates an expanded view of the portion selected in FIG. 7.

FIG. 8 illustrates an expanded view of portion 700 selected in FIG. 7 showing a much more detailed picture of the memory access pattern. In this figure, the use of color, as indicated by symbols, to represent cache performance will now be explained. Consider segment 820 that represents memory accesses to memory addresses in the region of 80003880(H). In this segment, most of the memory accesses resulted in cache hits and are plotted as green pixels according to key 810. However, a few accesses resulted in misses and are plotted as red pixels as indicated by the symbol of key 812. Some of the pixels represent accesses that included both hits and misses, and are therefore plotted as yellow pixels as indicated by the symbol of key 811. Thus, advantageously by looking at the plot of the simulated program execution, it is easy to distinguish using color in which memory regions and time periods cache hits and misses occur. Of course, in other embodiments symbols could be used in place of color, but the use of color makes it easier to observe and understand how well the cache is performing.

Figure 9:
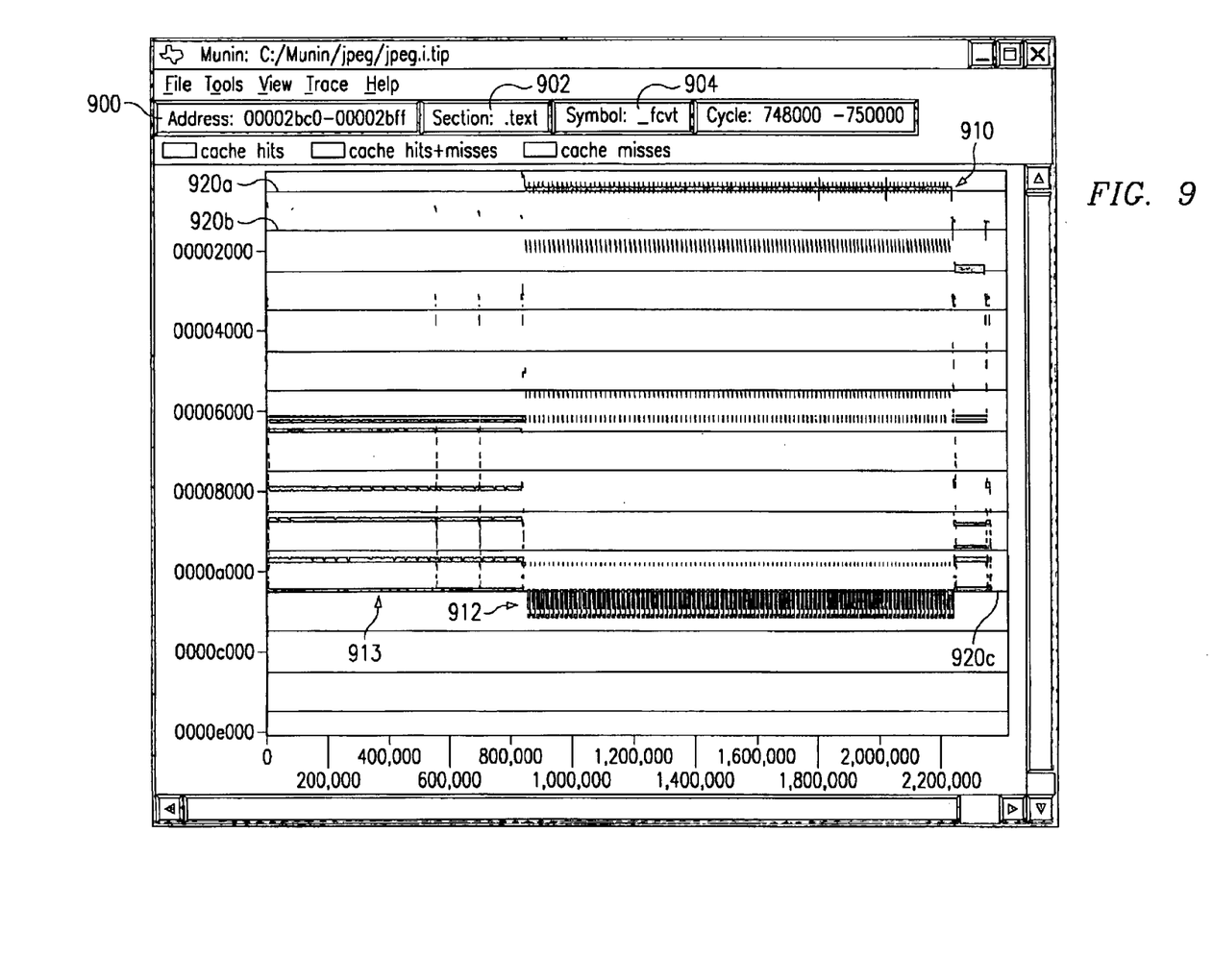
FIG. 9 is a plot of instruction cache performance for the simulated program execution of FIG. 6, illustrating an interference grid overlaid on the plot.

FIG. 9 is a plot of instruction cache performance for the simulated program execution of FIG. 6, illustrating an interference grid overlaid on the plot. However, for this plot, the jpeg.i.tip trace is selected, which encodes the instruction memory references, as described previously. For this trace, it can be seen that instruction references occur in the address range of 0x00000000 to 0x0000e000, as indicated on the vertical axis. Note again the function names are displayed in Symbol display are 902, 904 as the cursor is moved up and down over the graphical display area. The corresponding address is also displayed in address box 900.

Notice the horizontal "bars" across the display, such as 910, 912. Each bar represents a piece of code that is executed repeatedly at short time intervals over a long period of time. Moving the cursor over the bars will identify the functions containing the code; however, "overshoot" may cause a function name to be displayed that resides just past the executed function if the cursor selects that portion of the trace.

Notice also that a number of the bars are red, yellow or partly yellow along their horizontal extent, such as 910, 912. This signifies that the same pieces of code miss repeatedly in the cache within short periods of time. These repetitive misses are due to cache conflicts. Thus, a plurality of cache misses having temporal locality and spatial locality can be identified as a horizontally arranged grouping of pixels having a selected color indicative of a cache miss. Depending on the size of the program module being executed, the bar may be fairly narrow, such as at 913, or more dispersed, such as at 912.

This embodiment of the invention provides two tools for identifying which objects (functions in this case) create conflicts in the cache. They are an "interference grid" and an "interference shadow". From the "View" menu, "Interference grid" can be selected. Then, the origin of the grid is selected with a left click. A set of dark lines will be drawn across the display at every address that conflicts with the selected address, as illustrated at 920a, b, c. In this example, the interference grid has an origin of 0x00000800. Note the matching yellow parts of program module A at 910 (at around 0x00006800) and program module B at 912 (at around 0x0000a800). These two pieces of code both map to the same location in the cache. When they execute back to back, they evict each other from the cache, and subsequently, miss the next time they execute. To eliminate this, it is sufficient to move the program module B down by about 384 bytes. This can be done by using compiler pragmas and modifying the link command file.

To move the grid to a different origin, left click on an interference grid line and then left click at the new origin. The grid will be redrawn. The interference grid can be toggled off again using the "View" menu entry.

Figure 10:
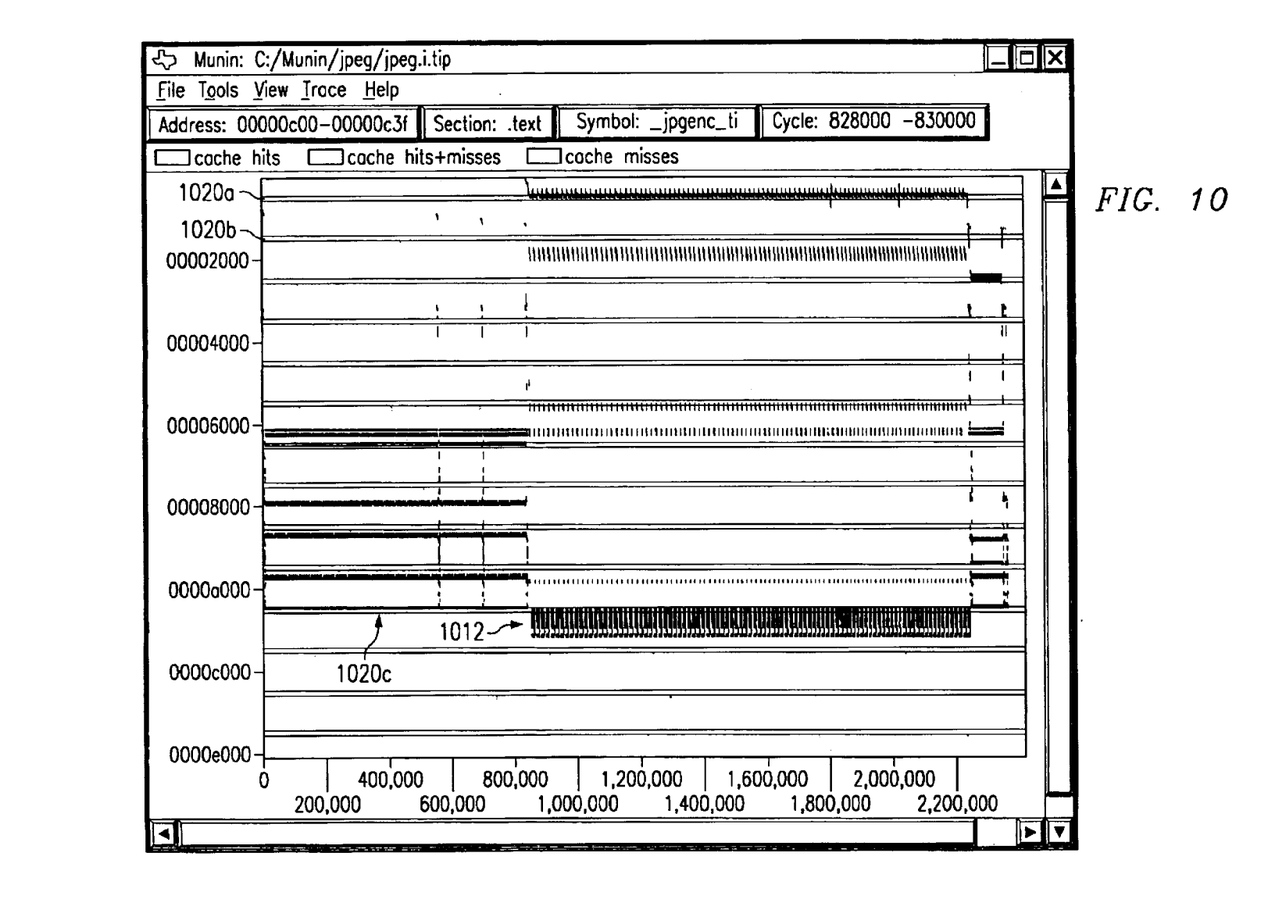
FIG. 10 is the same plot as FIG. 9 illustrating an interference shadow overlaid on the plot.

FIG. 10 is the same plot as FIG. 9 illustrating an interference shadow overlaid on the plot. From the "View" menu, an "Interference shadow" entry can also be selected. Again, the cursor can be used to select a function such as function B at 1012 located at about 0x0000a800 and left clicked. The resulting display will show dark bands across the graphical display area to indicate the address ranges that interfere in the cache with this function, such as bands 1020a, 1020b and 1020c, for example.

Executables suitable for use with this development tool can be generated using the standard code generation tools. In order to enable symbolic information to be displayed and to include size information about data and code objects the executables need to be recompiled with the -gp option on the C-compiler, this includes the various libraries.

A feature of the simulator is that an option is provided to "Track conflict misses."

When selected, this causes the simulator to determine which cache misses can be classified as conflict misses. The corresponding trace files are visualized showing conflict misses vs. all other references, i.e., instead of coloring cache hits differently from cache misses, conflict misses are colored differently from all other cache hits and misses.

Figure 11:
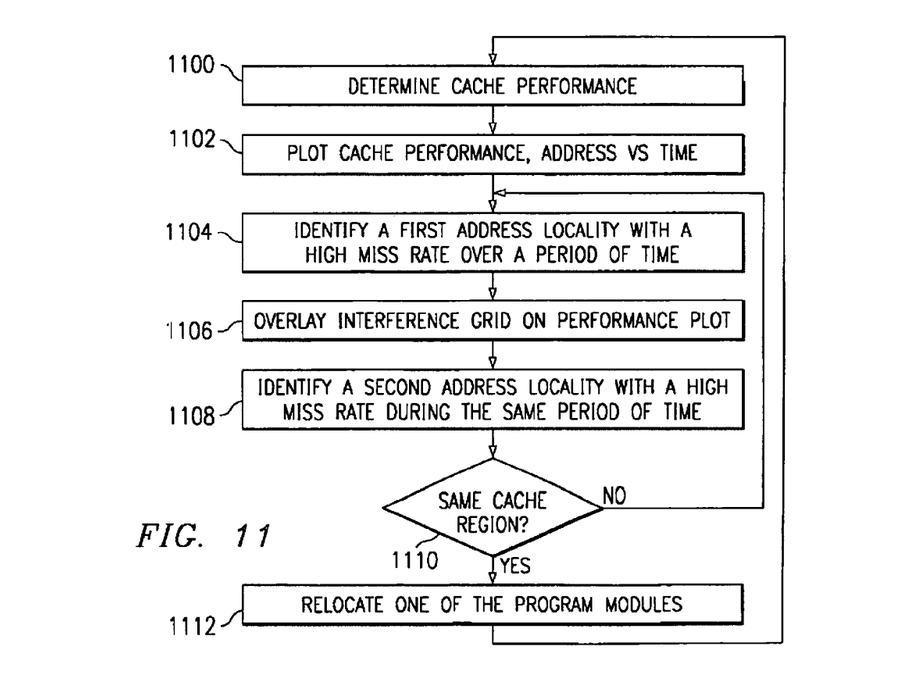
FIG. 11 is a flow chart illustrating relocation of program modules to reduce cache conflicts, according to an aspect of the present invention.

FIG. 11 is a flow chart illustrating relocation of program modules to reduce cache conflicts, according to an aspect of the present invention. In step 1100, cache performance is determined execution of a program over a period of time as a function of address locality. In one embodiment of the invention, the cache performance is determined by simulating the execution of the program, while in another embodiment cache performance is determined by tracing execution of the program on a digital system that is executing the program.

In step 1102, the performance data of the cache is plotted in two dimensional plot as a function of address versus time. Advantageously, various colors can be used to distinguish hits, misses, etc. The data may be segregated into separate files to allow selection of various plots, such as for data accesses, instruction accesses, loads, stores, etc. Various visualization enhancements may be provided, such as a zoom feature to allow better resolution of an address range and/or a time range.

In step 1104, an occurrence of high cache miss activity over a period of time in an address locality is identified. This can be by visual inspection of the plotted trace data, for example. An occurrence of cache misses having temporal locality and spatial locality can be identified as a horizontally arranged grouping of pixels having a selected color or colors indicative of a cache miss As such, color distinction between hit and miss points is advantageous. For example, if misses are coded as red, then any horizontal band of red would indicate a high miss rate over the corresponding time period. As discussed earlier, each pixel of a plot will generally represent a number of time periods and often a single pixel will encode both hit and miss data points. By representing such a mixed pixel as a third color, such as yellow, visual identification of cache misses is aided. In this case, any region having a horizontal band of red or yellow pixels indicates cache misses occurred during execution of the associated program function.

In step 1106, an interference grid or shadow grid in accordance with FIG. 9 or FIG. 10 is overlaid on the plotted trace data in such a manner that the grid corresponds to an address range associated with the region of high cache miss activity identified in step 1104.

In step 1108, a second occurrence of high cache miss activity in a different address locality during the same period of time as that of step 1104 is identified in a similar manner to step 1104. By comparing the interference grid or interference shadow to the location of the second occurrence, it can easily be determined if the two address localities map to the same region of the cache such that conflict misses are produced.

If two conflicting regions are identified, then a program module associated with one or the other region is relocated in step 1112. As described earlier, this is done by adjusting the link command file and then recompiling. If the conflicts are caused by a data structure, then the structure is relocated by adjustment of a pragma and then recompiling.

This process may be repeated in an iterative manner to reach a final solution that provides an improved cache hit performance.

In another embodiment, identification of a region of high cache miss rate in step 1104 and/or 1108 is done in an automated manner. The trace data can be time sliced to obtain a set of discrete time slices or a sliding time slice can be used. A selected trace file is sorted or filtered to locate trace data encoding cache misses that correspond to a particular address locality over a period of time. This can be done by sorting based on incremental ranges of addresses or on ranges of address associated with each program module, for example. In such an embodiment, once conflicts have been identified, then a relocation agent is invoked to assign new locations for conflicting program module and/or data structures. The program is then recompiled and re-executed. This automated process may be repeated in an iterative manner to reach a final solution that provides an improved cache hit performance.

Figure 12:
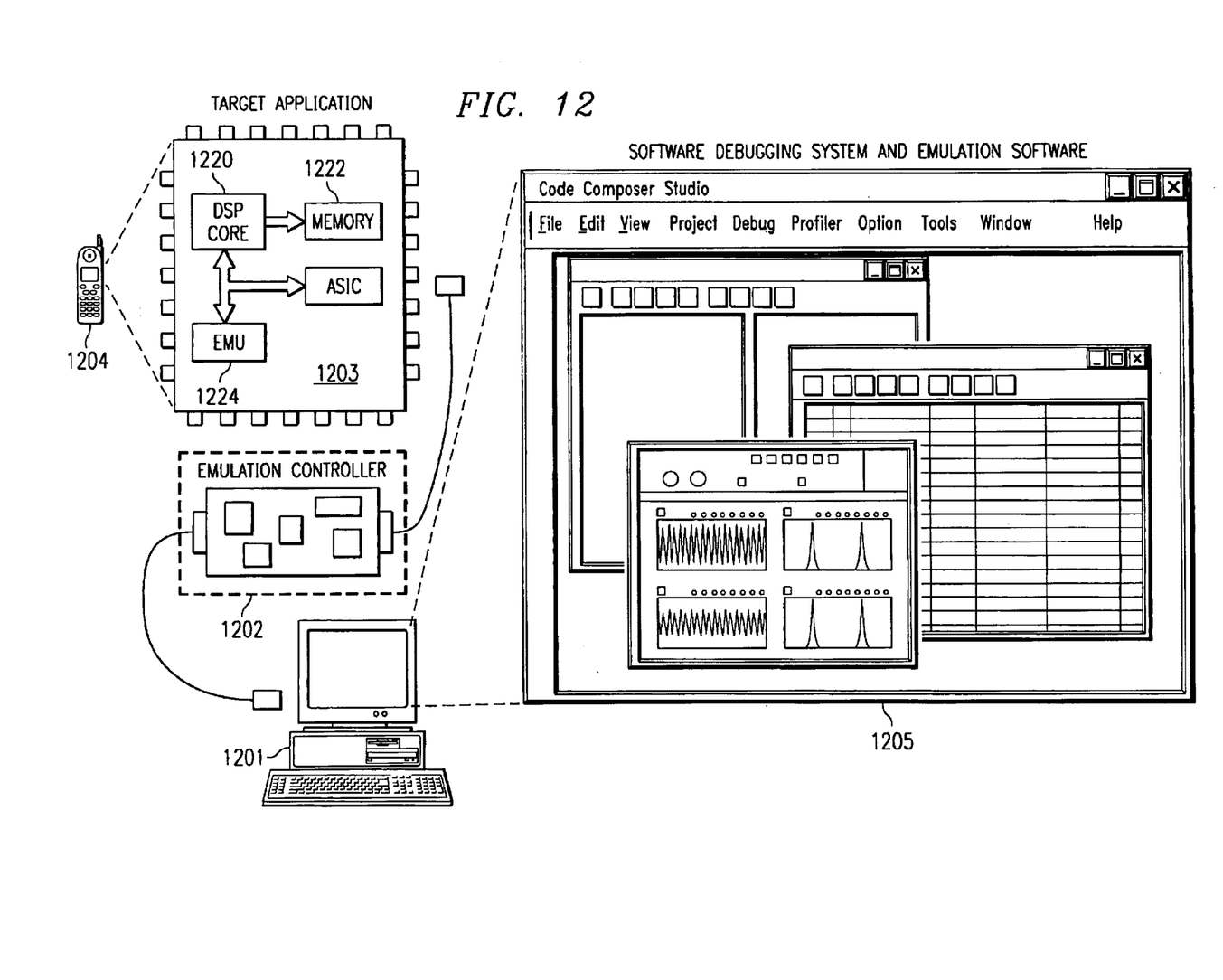
FIG. 12 illustrates the elements of an improved software development system for embedded applications.

FIG. 12 illustrates an embodiment of the present invention in an improved software development system for embedded applications. General-purpose personal computer 1201 is connected to target hardware 1203 with emulation controller 1202. Target hardware 1203 is a megacell that includes emulation/debug logic 1224 to support software debugging activities as well as digital signal processor (DSP) 1220 and memory 1222. U.S. Pat. Nos. 5,329,471 and 5,828,824 issued to Gary Swoboda, et al, describes in detail how to test and emulate a DSP. Other aspects of testing and emulating an integrated circuit are included in a known standard, IEEE 1149.1-1990 or later revisions entitled "Standard Test Access Port and Boundary Scan Architecture," which is also referred to as a "JTAG" test port. Improvements in IEEE 1149.1 are described in U.S. Pat. No. 5,828,824 issued to Gary Swoboda, entitled "Method for Debugging an Integrated Circuit Using Extended Operation Modes" and is incorporated herein by reference. Details of portions of target hardware 1203 relevant to an embodiment of the present invention are explained sufficiently below, so as to enable one of ordinary skill in the art of creating software systems to support the debugging of embedded applications to make and use the invention.

DSP 1220 is connected to memory 1222, which holds the application program that is to be optimized. Emulation logic 1224 interacts with emulation controller 1202 during the debugging of the application program. Typically, emulation controller 1202 is connected to target hardware 1203 through a JTAG test port. Personal computer 1201 hosts a software development system that incorporates software debugging and emulation software with which the user interacts through user interface 1205. Digital cellular telephone 1204 is illustrative of one of the many ways in which the target hardware and accompanying software may be packaged.

DSP 1220 is representative of any type of processor or microprocessor that can be included in other embodiments of the invention. Therefore, the present invention is not limited to DSP applications.

Figure 13:
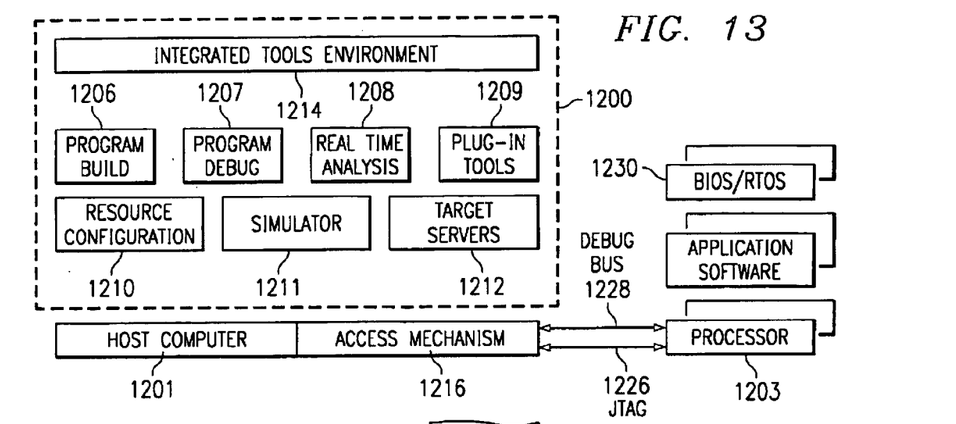
FIG. 13 is a block diagram of the logical architecture of the improved software development system of FIG. 12.

FIG. 13 is a block diagram of the logical architecture of an embodiment of software development system 1200 with user interface 1205 that executes on personal computer 1201. The software development system is comprised of a set of tightly integrated modules providing tools to support the entire software development process for DSP applications. At the top level, Integrated Tools Environment 1214 comprises user interface 1205, a source code editor, a code profiling tool, and a project management tool.

The second level of this architecture comprises the tools for generating code (block 1206), for debugging code (block 1207), and for analyzing the performance of the code in real-time (block 1208). In addition, this level includes support for adding additional development tools as "plug-ins" (block 1209). A "plug in" is a software application that may be dynamically added to the software development system to extend the functionality of the system.

The third level provides the low-level support for debugging. It comprises an instruction set simulator (block 1211) for host debugging, software for configuring the debug resources available on the target hardware (block 1210), and software for interfacing to the target hardware (block 1212).

An access mechanism 1216 connects the host computer and the system 1203. In this embodiment, access mechanism 1216 is embodied by emulation controller 1202; however, in other embodiments, debug resources can be accessed by other means, such as by a system bus, or by a wireless infrared or radio link, for example. Commands are sent to debug logic 1224 via JTAG test port 1226. Trace data is received on a debug bus 1228. In this embodiment, the debug bus is a Real Time Data Exchange (RTDX) bus, such as described in U.S. patent application Ser. No. 09/738,241 (docket number TI-29701), filed Dec. 15, 2000, entitled "Data Exchange Method and System for Processors" and is incorporated herein by reference. BIOS/RTOS 1230 provides basic operating system support for the application as well as some low level support enabling the application to run in real-time while debugging information is collected.

In this embodiment, only a single target system 1203 is illustrated; however, more than one target system, as indicated by the dashed boxes, can be connected to access mechanism 1216 and controlled by the software development system.

Figure 14:
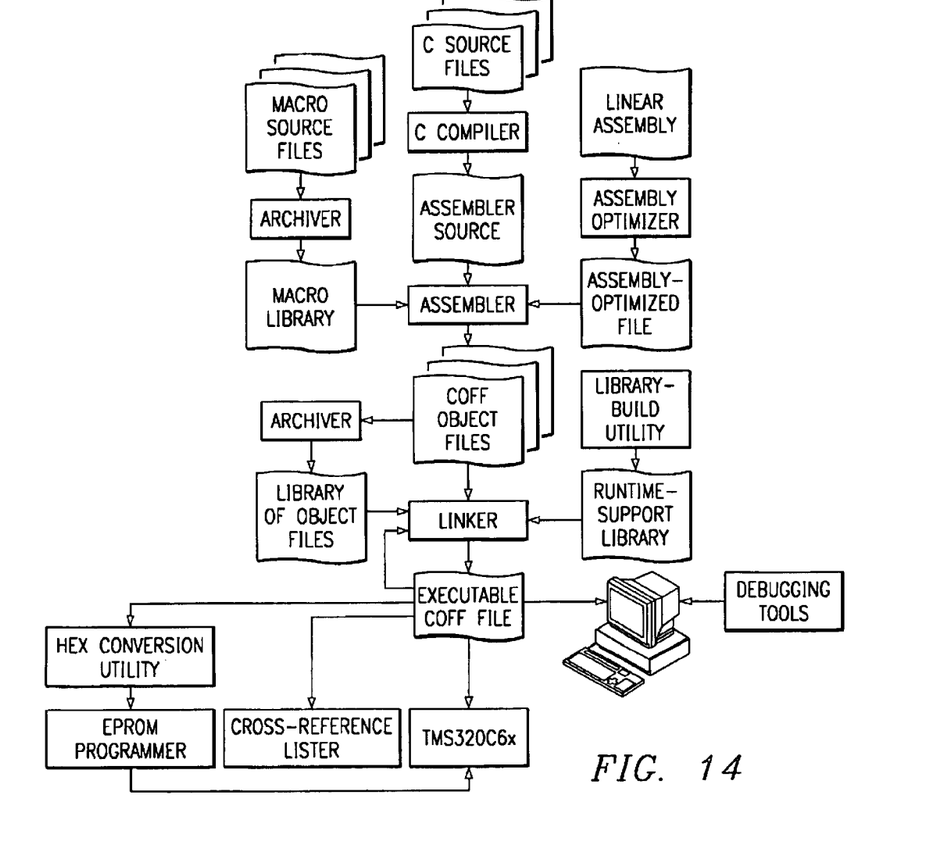
FIG. 14 is a more detailed block diagram of the program build block of FIG. 13.

FIG. 14 is a more detailed block diagram of program build block 1206 of FIG. 13. The DSP code generation tools provide the foundation for the development environment provided by Code Composer Studio. The C compiler accepts C source code and produces appropriate DSP assembly language source code. The assembler translates assembly language source files into machine language object files. The machine language is based on a common object file format (COFF). The assembly optimizer allows linear assembly code to be written without being concerned with the pipeline structure or with assigning registers. It assigns registers and uses loop optimization to turn linear assembly into highly parallel assembly that takes advantage of software pipelining. The linker combines object files into a single executable object module. As it creates the executable module, it performs relocation and resolves external references. The linker accepts relocatable COFF object files and object libraries as input. The archiver allows collection of a group of files into a single archive file, called a library. The archiver also allows modification of a library by deleting, replacing, extracting, or adding members.

The library-build utility may be used to build a customized runtime-support library. The runtime-support libraries contain the ANSI standard runtime-support functions, compiler-utility functions, floating-point arithmetic functions, and C I/O functions that are supported by the compiler. The hex conversion utility converts a COFF object file into TI-Tagged, ASCII-hex, Intel, Motorola-S, or Tektronix object format. The converted file may be downloaded to an EPROM programmer. The cross-reference lister uses object files to produce a cross-reference listing showing symbols, their definitions, and their references in the linked source files.

An application may be created by adding files to a project. The project file is used to build the application. Files in a project can include C source files, assembly source files, object files, libraries, and linker command files. An easy-to-use window allows specification of the options to use when compiling, assembling, and linking a project. Using a project, a programmer can create a full build, an incremental build, and can compile individual files. It can also scan files to build a dependency tree for the entire project.

As used herein, the terms "applied," "connected," and "connection" mean electrically connected, including where additional elements may be in the electrical connection path. "Associated" means a controlling relationship, such as a memory resource that is controlled by an associated port. The terms assert, assertion, de-assert, de-assertion, negate and negation are used to avoid confusion when dealing with a mixture of active high and active low signals. Assert and assertion are used to indicate that a signal is rendered active, or logically true. De-assert, de-assertion, negate, and negation are used to indicate that a signal is rendered inactive, or logically false.

While the invention has been described with reference to illustrative embodiments, this description is not intended to be construed in a limiting sense. Various other embodiments of the invention will be apparent to persons skilled in the art upon reference to this description. For example, other types of run-time behavior can be optimized in a similar manner as described above for cache hit/misses. For example, memory bank stalls due to memory accesses from multiple sources can be analyzed and requests rescheduled to reduce conflict. Similarly, cross-path stalls due to conflicting accesses by multiple requesters to multiple target resources can be analyzed so that resource utilization can be reassigned to reduce conflicts. In such embodiments, the graphical user interface is equipped to allow "click on the plot to view the appropriate source" functionality.

It is therefore contemplated that the appended claims will cover any such modifications of the embodiments as fall within the true scope and spirit of the invention.

What is claimed is:

1. A method for reducing execution time of a program executed on a digital system by improving hit rate in a cache of the digital system, comprising the steps of:
    a) determining cache performance during execution of the program over a period of time as a function of address locality;
    b) identifying a first occurrence of high cache miss rate over a first portion of time within the period of time associated with a first address locality;
    c) identifying a second occurrence of high cache miss rate over the first portion of time associated with a second address locality;
    d) determining that the first address locality and the second address locality generally map to a same region of the cache, wherein said step of determining comprises overlying an interference grid on the plot responsive to the first address locality such that a plurality of lines are displayed at other address localities that map to the same region in cache as the first address locality; and
    e) relocating a portion of the program contained in the second address locality to a different address locality that generally maps to a different region of the cache.

2. The method of claim 1, wherein step a) comprises tracing simulated execution of the program or actual execution of the program.

3. The method of claim 1, wherein step a) comprises providing a 2D plot of cache operation as a function of address versus time for the period of time.

4. The method of claim 3, further comprising using color-coding to indicate that a pixel represents a hit, a miss, or a combination of hit and miss.

5. The method of claim 3, further comprising providing zoom for extra resolution.

6. The method of claim 1, wherein steps b) and c) comprises identifying a plurality of cache misses having temporal locality and spatial locality as a horizontally arranged grouping of pixels having a selected color indicative of a cache miss.

7. The method of claim 1, wherein steps b) and c) comprises identifying a plurality of cache misses having temporal locality and spatial locality by analysis of the data without regard to a visual plot.

8. The method of claim 1, wherein step e) comprises selecting a program module that resides at the second address locality by clicking on the 2D plot at the second address locality.

9. The method of claim 1, wherein step e) comprises providing a relocation parameter to a linker to cause the portion of the program to be linked at a different address.

10. A tool for developing a program for execution on a digital system having a cache, comprising:
    means for determining cache performance during execution of the program over a period of time as a function of address locality;
    means for identifying a first occurrence of high cache miss rate over a first portion of time within the period of time associated with a first address locality;
    means for identifying a second occurrence of high cache miss rate over the first portion of time associated with a second address locality;
    means for determining that the first address locality and the second address locality generally map to a same region of the cache, wherein said step of determining comprises overlying an interference grid on the plot responsive to the first address locality such that a plurality of lines are displayed at other address localities that map to the same region in cache as the first address locality; and
    means for relocating a portion of the program contained in the second address locality to a different address locality that generally maps to a different region of the cache.

11. A method for reducing execution time of a program executed on a digital system by improving hit rate in a cache of the digital system, comprising the steps of:

a) determining cache performance during execution of the program over a period of time as a function of address locality;

b) identifying a first occurrence of high cache miss rate over a first portion of time within the period of time associated with a first address locality;

c) identifying a second occurrence of high cache miss rate over the first portion of time associated with a second address locality;

d) determining that the first address locality and the second address locality generally map to a same region of the cache, wherein said step of determining comprises overlying an interference shadow on the plot responsive to the first address locality such that a plurality of shadows are displayed at other address localities that map to the same region in cache as the first address locality; and e) relocating a portion of the program contained in the second address locality to a different address locality that generally maps to a different region of the cache.

12. The method of claim 11, wherein step a) comprises tracing simulated execution of the program or actual execution of the program.

13. The method of claim 11, wherein step a) comprises providing a 2D plot of cache operation as a function of address versus time for the period of time.

14. The method of claim 13, further comprising using color-coding to indicate that a pixel represents a hit, a miss, or a combination of hit and miss.

15. The method of claim 13, further comprising providing zoom for extra resolution.

16. The method of claim 11, wherein steps b) and c) comprises identifying a plurality of cache misses having temporal locality and spatial locality as a horizontally arranged grouping of pixels having a selected color indicative of a cache miss.

17. The method of claim 11, wherein steps b) and c) comprises identifying a plurality of cache misses having temporal locality and spatial locality by analysis of the data without regard to a visual plot.

18. The method of claim 11, wherein step e) comprises selecting a program module that resides at the second address locality by clicking on the 2D plot at the second address locality.

19. The method of claim 11, wherein step c) comprises providing a relocation parameter to a linker to cause the portion of the program to be linked at a different address.

* * * * *